Patented Apr. 11, 1950

2,503,296

UNITED STATES PATENT OFFICE 2,503,296

IODINATED HYDROXYARYL-ARYLOXY-ALIPHATIC ACIDS AND THEIR THIO ANALOGS

Domenick Papa, Brooklyn, N. Y., and Erwin Schwenk, Montclair, N. J., assignors to Schering Corporation, Bloomfield, N. J., a corporation of New Jersey No Drawing. Application November 27, 1946, Serial No. 712,734

10 Claims. (Cl. 260—516)

This invention relates to hydroxyaryl-aryloxy-aliphatic acids and their thio analogs, and particularly to aryloxy- and arylmercapto derivatives of hydroxyphenyl propionic acids and the corresponding cinnamic acid derivatives, and their iodinated compounds containing iodine in the phenolic ring, and the salts of such acids, having particular utility as bactericidal and antiamebic agents and also as contrast agents for radiography of the gall bladder, and to methods for making such compounds.

It is an object of the invention to make a group of compounds useful as chemotherapeutic agents.

It is a further object of the invention to provide a group of iodine-containing antiamebic drugs of very low toxicity. The iodine-containing compounds of the invention provide a group of antiamebic agents in which the iodine is firmly bound to an aromatic nucleus and which are ultimately eliminated from the body in substantially unchanged condition when administered orally. The stability of the iodine in the compounds of the invention eliminates the occurrence of iodinism both when administered as amebicides and when used as X-ray contrast agents.

The compounds of the invention may be represented by the general formula

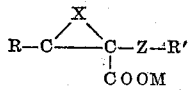

and salts thereof, wherein R represents a hydroxyphenyl group which may be iodinated, wherein R' represents an aryl group selected from the benzene and the naphthalene series which may be substituted, for example, by halogen, hydroxyl, alkyl, or alkoxy groups, Z represents oxygen or sulfur, X represents two hydrogens or a carbon to carbon bond, and M represents hydrogen or a salt-forming group.

Of particular interest are the α-aryloxy-hydroxycinnamic acids, the α-arylmercapto-hydroxycinnamic acids, the α-aryloxy-β-hydroxyphenylpropionic acids and the α-arylmercapto-β-hydroxyphenylpropionic acids, and their iodinated compounds containing iodine in the phenolic ring, and their salts, particularly the alkali metal, alkaline earth metal, ammonium, alkylamine and hydroxyalkylamine salts.

The compounds of the invention may be made by methods involving reactions of the type known as the Perkin or modified Perkin reaction. The unsaturated aliphatic acid compounds of the invention may conveniently be made by condensing a hydroxyaryl aldehyde with an aryloxy- or arylmercapto-aliphatic acid or its alkali metal salt. The unsaturated acids thereby obtained may be hydrogenated to obtain the saturated aliphatic acids, and the hydrogenated compounds may then be iodinated. By condensing an iodinated hydroxyaryl aldehyde with the aryloxy- or arylmercapto-aliphatic acid or its alkali metal salts, the iodinated unsaturated aliphatic acid compounds of the invention may be obtained.

Typical aldehydes which may be used in producing the compounds of the invention are p-hydroxybenzaldehyde, salicylaldehyde, 3,5-diiodo-4-hydroxybenzaldehyde and 3,5-diiodo-2-hydroxybenzaldehyde. Typical substituted aliphatic acids which may be condensed with the above-named aldehydes are phenoxyacetic acid, α-naphthoxyacetic acid, β-naphthoxyacetic acid, their thio analogs, such as phenyl thioglycollic acid, α-naphthyl thioglycollic acid, β-naphthyl thioglycollic acid, and their halogen, hydroxy, alkyl and alkoxy substitution products.

The following examples are illustrative of the methods and compounds of the invention:

EXAMPLE I

*α-Phenylmercapto-p-hydroxycinnamic acid*

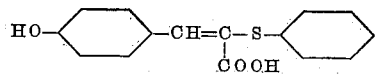

α-Phenylmercapto-p-hydroxycinnamic acid may be prepared by either of the following methods:

(a) Condense 16.8 gm. of phenylthioglycollic acid, 12.2 gm. of p-hydroxybenzaldehyde, 200 cc. of acetic anhydride and 10 gm. of anhydrous triethylamine. The reaction is run in a nitrogen atmosphere at 100–110° C. for approximately 48 hours. The reaction product is then cooled to 60° C., the excess acetic anhydride decomposed with water and then poured on ice. The semi-solid residue is extracted with ether, the ether solution washed with water and then extracted with 10% sodium carbonate. The sodium carbonate extracts are neutralized with HCl, treated, with charcoal, filtered, and acidified. The crude α-phenylmercapto-p-hydroxycinnamic acid melts at 206–209° C. Recrystallized from acetone and water, M. P. 211.5–213.5° C.

(b) Condense for 36–40 hours at 100–110° C. in an atmosphere of nitrogen 51.5 gm. of the anhydrous potassium salt of phenylthioglycollic acid, 30.5 gm. of p-hydroxybenzaldehyde, and 400 cc. of acetic anhydride. The reaction product is worked up as described above.

EXAMPLE II

α-Phenylmercapto-β-(p-hydroxyphenyl)-propionic acid

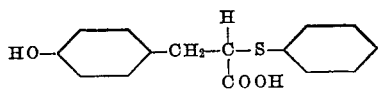

The above described cinnamic acid can be reduced in very dilute alkaline solution with sodium amalgam or catalytically with palladium on charcoal catalyst. The α-phenylmercapto-β-(p-hydroxyphenyl)-propionic acid obtained after recrystallization from aqueous alcohol melts at 126–127° C.

EXAMPLE III

α-Phenylmercapto-β-(3,5-diiodo-4-hydroxyphenyl)-propionic acid

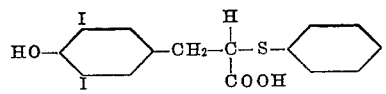

To 28.4 g. of the propionic acid dissolved in 800 cc. water containing 16 g. of sodium hydroxide there is slowly added with stirring a solution of 50.8 g. of iodine and 50.8 g. of potassium iodide dissolved in 250 cc. water. The reaction mixture is stirred for a short time after the addition of the iodine solution, treated with sodium bisulfite and acidified to Congo red paper with HCl. The 3,5-diiodo compound precipitates as a semisolid which on recrystallization from a mixture of chloroform-petroleum ether melts at 130–131° C.

EXAMPLE IV

α-Phenoxy-p-hydroxycinnamic acid

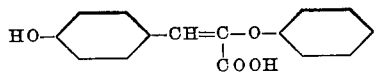

α-Phenoxy-p-hydroxycinnamic acid may be prepared essentially as described in Example I.

(a) Thirty-eight grams of phenoxyacetic acid, 30.5 gm. of p-hydroxybenzaldehyde, 25 gm. of anhydrous triethylamine and 350–400 cc. of acetic anhydride are heated with stirring at 110° C. for 30 hours. The reaction product is worked up as described under Example I. The crude α-phenoxy-p-hydroxycinnamic acid melts at 236–240° C. Recrystallized from aqueous methyl alcohol, M. P. 245–246° C.

(b) Forty-seven grams of anhydrous potassium α-phenoxyacetate and 30 gm. of p-hydroxybenzaldehyde are heated with 400 cc. of acetic anhydride for 10 hours at 150° C. The crude product after isolation as described above is recrystallized from dilute methyl alcohol.

EXAMPLE V

α-Phenoxy-β-(p-hydroxyphenyl)-propionic acid

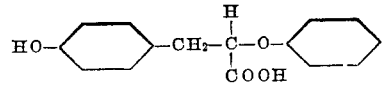

Reduction of the cinnamic acid can be carried out either with sodium amalgam in very dilute alkali, by catalytic hydrogenation with nickel or Adams platinum oxide catalyst or cautiously with Raney's alloy and aqueous alkali at 25–30° C. The reduction product after isolation and recrystallization from aqueous alcohol melts at 169–170° C.

EXAMPLE VI

α-Phenoxy-β-(3,5-diiodo-4-hydroxyphenyl)-propionic acid

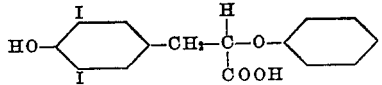

Iodination of the phenoxypropionic acid in accordance with the instructions of Example I yields the 3,5-diiodo compound which melts at 135–136° C. after recrystallization from benzene-petroleum ether.

EXAMPLE VII

α-Phenoxy-3,5-diiodo-4-hydroxycinnamic acid

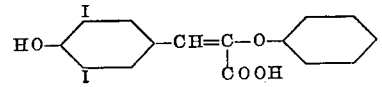

A mixture of 15.2 g. of phenoxyacetic acid, 37.6 g. of 3,5-diiodo-4-hydroxybenzaldehyde, 10 g. anhydrous triethylamine and 200–300 cc. of freshly distilled acetic anhydride is heated with stirring at 100–110° C. for approximately 40–50 hours. The reaction mixture is then cooled to 60° C. and the excess acetic anhydride cautiously decomposed with water. The semi-solid condensation product is extracted with ether, the ether extracts extracted with dilute sodium carbonate and after acidification of the alkaline extracts the crude cinnamic acid is filtered off. Recrystallized from aqueous acetone, the compound is obtained as pale yellow needles melting at 224.5–226.5° C.

The above described reaction can also be carried out by using the alkali metal salts of phenoxyacetic acid, for example, by heating 19 g. of anhydrous potassium phenoxyacetate with 37.6 g. of 3,5-diiodo-4-hydroxybenzaldehyde and 300 cc. of acetic anhydride for approximately 50–60 hours at 110° C. The cinnamic acid derivatives can be isolated in accordance with the procedure described above.

EXAMPLE VIII

α-Phenylmercapto-3,5-diiodo-4-hydroxycinnamic acid

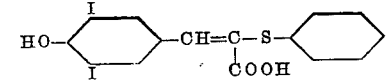

In accordance with procedures described under Example III, 20.6 g. of anhydrous potassium phenylthioglycolate, 37.4 g. 3,5-diiodo-4-hydroxybenzaldehyde and 350 cc. of acetic anhydride are heated for approximately 35–50 hours at 110° C. The reaction product is worked up as described and after recrystallization from aqueous alcohol the substituted cinnamic acid melts at 218–220° C.

By procedures similar to those described in Examples VII and VIII, substituted phenoxy- and naphthoxy-compounds and their thio analogs can be made. For example, α-(2,4-dichlorophenoxy)-3,5-diiodo-4-hydroxycinnamic acid may be made by condensing anhydrous potassium 2,4-dichlorphenoxy acetate with 3,5-diiodo-4-hydroxybenzaldehyde in acetic anhydride, and α-(1-naphthoxy)-3,5-diiodo-4-hydroxycinnamic acid may be made by condensing anhydrous potassium α-naphthoxyacetate with 3,5-diiodo-4-hydroxybenzaldehyde in acetic anhydride.

We claim:

1. A method of making polyiodohydroxyaryl-aryloxy-aliphatic acids and their thio analogs which comprises heating a hydroxybenzaldehyde with a compound selected from the group consisting of phenoxy-acetic acids and phenyl-thioglycollic acids and the salts thereof under substantially anhydrous conditions in the presence of an anhydride of a lower fatty acid, hydrogenating the aliphatic double bond of the resulting substituted cinnamic acids, and iodinating the substituted propionic acids thereby obtained to produce a substituted propionic acid of the general formula

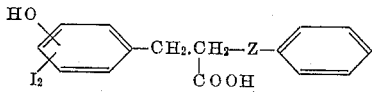

wherein Z is selected from the group consisting of oxygen and sulfur.

2. α-Phenoxy-β-(4-hydroxy-3,5-diiodophenyl)-propionic acid.

3. α-Phenylmercapto-β-(4-hydroxy-3,5-diiodophenyl)-propionic acid.

4. A method of making polyiodohydroxyphenylphenoxy propionic acids which comprises heating p-hydroxybenzaldehyde with phenoxyacetic acid under substantially anhydrous conditions in the presence of an anhydride of a lower fatty acid, hydrogenating the aliphatic double bond of the resulting substituted cinnamic acid, and iodinating the substituted propionic acid thereby obtained to produce α-phenoxy-β-(4-hydroxy-3,5-diiodophenyl)-propionic acid.

5. A method of making polyiodohydroxyphenylphenoxy propionic acids which comprises heating p-hydroxybenzaldehyde with an alkali metal salt of phenoxyacetic acid under substantially anhydrous conditions in the presence of an anhydride of a lower fatty acid, hydrogenating the aliphatic double bond of the resulting substituted cinnamic acid, and iodinating the substituted propionic acid thereby obtained to produce α-phenoxy-β-(4-hydroxy-3,5-diiodophenyl)-propionic acid.

6. A salt of α-phenoxy-β-(4-hydroxy-3,5-diiodophenyl)-propionic acid.

7. A therapeutic compound of the group consisting of aryl substituted aliphatic acids of the general formula

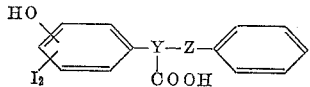

and the non-toxic salts thereof wherein Y is a two carbon atom aliphatic chain, Z is selected from the group consisting of oxygen and sulfur, the carboxyl and phenyl radicals being attached to one carbon atom and the diiodohydroxyphenyl radical to the other carbon atom of the aliphatic chain.

8. Aryl substituted aliphatic acids of the general formula

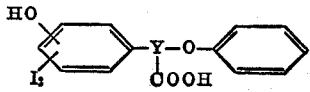

wherein Y is a two carbon atom aliphatic chain, the carboxyl and phenyl radicals being attached to one carbon atom and the diiodohydroxyphenyl radical being attached to the other carbon atom of the aliphatic chain.

9. Non-toxic salts of aryl substituted aliphatic acids of the general formula

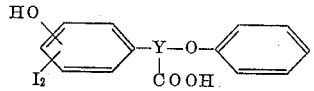

wherein Y is a two carbon atom aliphatic chain, the carboxyl and phenyl radicals being attached to one carbon atom and the diiodohydroxyphenyl radical being attached to the other carbon atom of the aliphatic chain.

10. Non-toxic salts of aryl substituted aliphatic acids of the general formula

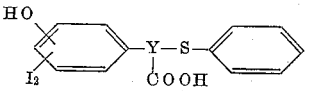

wherein Y is a two carbon atom aliphatic chain, the carboxyl and phenyl radicals being attached to one carbon atom and the diiodohydroxyphenyl radical being attached to the other carbon atom of the aliphatic chain.

DOMENICK PAPA.
ERWIN SCHWENK.

REFERENCES CITED

The following references are of record in the file of this patent:

UNITED STATES PATENTS

| Number | Name | Date |
|---|---|---|
| 2,322,761 | Lontz | June 29, 1943 |
| 2,345,384 | Dohrn et al. | Mar. 28, 1944 |

FOREIGN PATENTS

| Number | Country | Date |
|---|---|---|
| 765,840 | France | June 16, 1934 |

OTHER REFERENCES

Stoermer et al., Ber. Deut. Chem., vol. 35, page 3557 (1902).

Salway, J. Chem. Soc. (London), vol. 97, page 2417 (1910).

Troeger et al., Beilstein, Handbuch, 4th ed.), vol. 10, page 438 (1927).

Valentini, Beilstein (Handbuch, 4th ed.), vol. 10, page 438 (1927).

Andreasch, Beilstein (Handbuch, 4th ed., 2nd suppl.), vol. 10, page 214 (1932).

Certificate of Correction

Patent No. 2,503,296

April 11, 1950

DOMENICK PAPA ET AL.

It is hereby certified that error appears in the printed specification of the above numbered patent requiring correction as follows:

Column 5, line 42, before the word "salt" insert *non-toxic*;

and that the said Letters Patent should be read with this correction therein that the same may conform to the record of the case in the Patent Office.

Signed and sealed this 11th day of July, A. D. 1950.

[SEAL]

THOMAS F. MURPHY,
*Assistant Commissioner of Patents.*